June 15, 1965

A. J. DANEK 3,189,771

SYNCHRONOUS MOTOR INCLUDING ADDITIONAL ROTOR
POLE TO FACILITATE STARTING

Filed Oct. 25, 1960

INVENTOR.
August J. Danek
BY
Attorney

June 15, 1965 A. J. DANEK 3,189,771
SYNCHRONOUS MOTOR INCLUDING ADDITIONAL ROTOR
POLE TO FACILITATE STARTING
Filed Oct. 25, 1960 2 Sheets-Sheet 2

*INVENTOR.*
August J. Danek
BY
Bayard H. Michael
Attorney

United States Patent Office 3,189,771
Patented June 15, 1965

3,189,771
SYNCHRONOUS MOTOR INCLUDING ADDITIONAL ROTOR POLE TO FACILITATE STARTING
August J. Danek, Crystal Lake, Ill., assignor to Controls Company of America, Schiller Park, Ill., a corporation of Delaware
Filed Oct. 25, 1960, Ser. No. 64,775
4 Claims. (Cl. 310—156)

This invention relates to permanent magnet synchronous motors and particularly to a positive starting device for such motors.

Motors of the type contemplated herein have a permanent magnet rotor which rotates in a stator of alternate pole pieces arranged in a circle. When the rotor is stopped, the poles do not have any polarity and the rotor, being a magnet, tends to stop in a position where the maximum amount of iron will be in the magnetic field of the rotor. This position is one in which the salient poles of the rotor bridge the poles of the stator. Since it stops in a bridging position, the adjacent stator poles will, when the motor is energized, assume opposite polarity causing the rotor to rotate. The assumption of the bridging position is dependent on the rotor being free to stop. Since the rotor is connected to drive something, it is possible for the driven mechanism to prevent the rotor from assuming a normal position and it will sometimes stop in a position where the salient poles are aligned with the alternate poles of the stator. When the stator is then energized, the electromagnetic field will be balanced and the rotor will not rotate since the rotor is electrically on "dead center." This is infrequent in occurrence but there are situations in which the occurrence, though rare, is highly undesirable. This is, incidentally, one of the conditions where the user's impulse to hit or kick the recalcitrant machine is correct since the jolt is generally enough to get the rotor off dead center.

The primary object of this invention is to provide a motor construction in which the assumption of a null position will not interfere with the starting of the motor.

This is accomplished by mounting a ferrous metal arm on the rotor so that the polarity of one of the pole pieces is induced in the arm which is so disposed that it will bridge the stator poles when the rotor is stopped in a null or bridging position. On energization the arm will be repelled by the adjacent pole piece of the same polarity and attracted by the adjacent pole of opposite polarity creating an unbalanced condition in the rotor. While this force is of low magnitude, it is sufficient to pull the rotor out of the null position and permit the normal forces to take over.

Other objects and advantages will be pointed out in, or be apparent from, the specification and claims, as will obvious modifications of the single embodiment shown in the drawings, in which:

Figure 1:
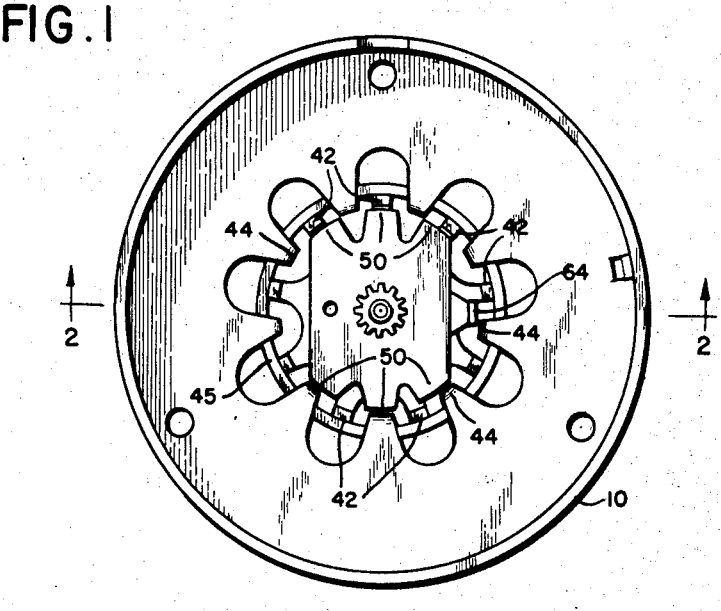
FIG. 1 is a top view of a motor with the gear train removed showing the rotor at a null point.
Figure 2:
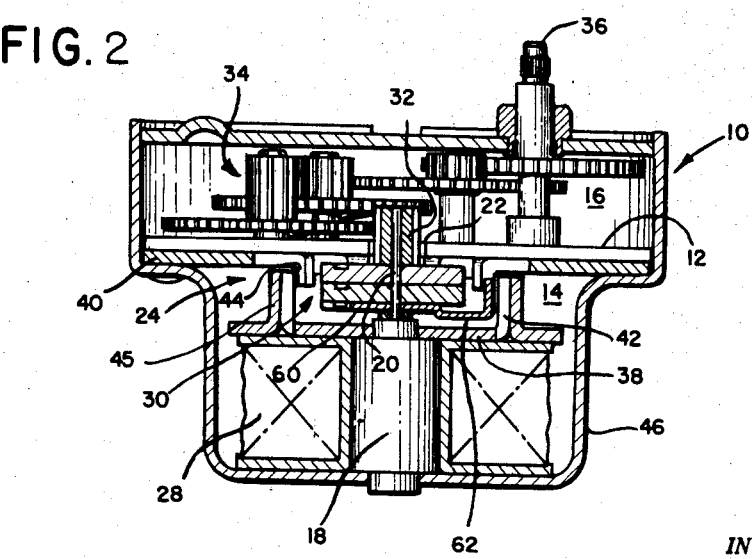
FIG. 2 is taken on line 2—2 of FIG. 1 showing the gear train connected to the rotor.

As seen in the drawings, the synchronous motor includes a housing 10 divided by plate 12 into motor section 14 and gear section 16. An armature core 18 is centrally mounted within the motor section and supports shaft 20 which projects through aperture 22 in the plate into the gear section. An electro-magnetic circuit is set up in the field structure 24 by energizing coil 28 wrapped on core 18. A permanent magnet rotor 30 is positioned to rotate on shaft 20 when the coil is energized and carries drive pinion 32 which is in operative engagement with gear train 34 to rotate drive shaft 36.

The field structure includes an inner spider 38 which is secured to the inner end of core 18 and has a number of finger-like projections 42 which are turned upward inside of ring 45 to form a circle of equally spaced poles around the periphery of the rotor. An outer spider 40 is held against the housing by plate 12 and has a number of finger-like projections 44 which are bent downward inside of ring 45 and intermediate the projections 42 to form a stator of alternate poles having the opposite polarity. On energization of the coil, an elecro-magnetic field will be set up in the stator with the polarity of the inner end of core 18 induced in the poles of the inner spider and the polarity of the outer end of the core induced in the poles of the outer spider through the wall 46 of the housing.

Figure 3:
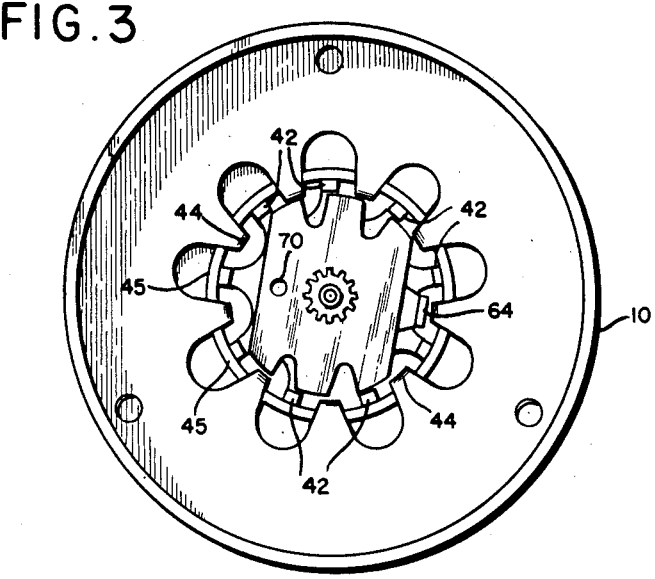
FIG. 3 is similar to FIG. 1 showing the rotor in a normal starting position.
Figure 6:
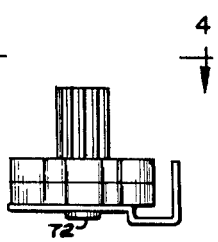
FIG. 6 is taken on line 6—6 of FIG. 4.
Figure 4:
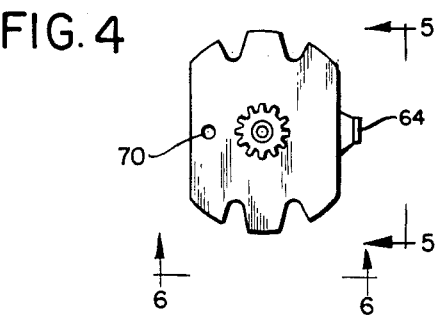
FIG. 4 is a top view of the rotor.
Figure 5:
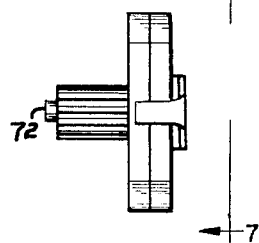
FIG. 5 is taken on line 5—5 of FIG. 4.
Figure 7:
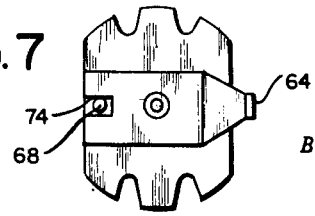
FIG. 7 is taken on line 7—7 of FIG. 5.

As seen in FIGS. 1 and 3 the rotor has three poles 50 at each end which are aligned with alternate poles in the stator. When the rotor is allowed to rotate freely on the shaft, it will come to rest with the rotor poles bridging the gaps between the stator poles (FIG. 3) setting up a magnetic field between the rotor poles and the stator poles. When the coil is energized setting up the electromagnetic circuit in the poles of the stator, the rotor will rotate in either direction due to the unbalanced magnetic field as is commonly understood in synchronous motors. When the rotor is operatively connected to the gear train, it cannot rotate freely, and it will sometimes stop with the rotor poles directly opposite either the poles of the inner spider or the poles of the outer spider (FIG. 1.) When the coil is then energized, the electro-magnetic field set up between the stator and the rotor will be balanced and the rotor will remain stationary in a null position.

To overcome this problem, a ferrous metal arm 60 is secured to the rotor and extends outwardly from the rotor transversely to the rotor's magnetic axis. The end of the arm is bent upward to form pole 64 which rotates in a circle adjacent to the poles of the stator. The lower portion 62 of the arm rotates over the face of the inner spider which will induce the same polarity in pole 64 as in the poles of the inner spider. When the rotor stops in a "normal" position (FIG. 3) with the rotor poles bridging the stator poles, pole 64 of the arm will be directly opposite one of the poles of either the inner or outer spider. Energization of the coil will set up an electromagnetic field in the stator and due to the position of the rotor, the electro-magnetic field will be unbalanced causing the rotor to start rotating. The end 64 of the arm will have no appreciable effect on the rotor when it is in normal position.

When the rotor stops in a null position with its poles directly opposite the poles of either of the inner or outer spider (FIG. 1), the end 64 of the arm will bridge one of the gaps between poles 42 and 44. On energization of the coil pole 64 will assume the polarity of the inner spider and since it is now bridging the gap between the stator poles, the electro-magnetic field acting on the pole on the end of the arm will be unbalanced. This small unbalanced force will be sufficient to cause the arm to move toward the pole of the outer spider, since it has assumed the polarity of the inner spider, rotating the rotor out of the null position. Only a small amount of angular motion is necessary to move the rotor out of the null position. The effectiveness of this arrangement can be demonstrated by using a non-magnetic rotor with a ferrous metal arm secured thereto and allowing the rotor to rotate, once started, by the force induced in the arm alone.

The location of the arm with respect to the rotor is important since the arm must not assume any polarity from the permanent magnet. This is accomplished in the fabrication of rotors by stamping an indentation 70 and extrusion 68 on opposite sides of permanent magnetic members 30 so that the extrusion on one member will cooperate with the indentation on the next member when a number of the members are mounted on hollow rivet 72. The arm is apertured to fit on the rivet and has a slot 74 on one end which is aligned with the extrusion projecting from the bottom face of the rotor. The extrusion is located on a line which is transverse to both the longitudinal and rotational axis of the rotor so that the arm lies on the same transverse line. The arm will therefore lie equidistant from each end of the rotor and will be magnetically neutral.

Although but a single embodiment of the present invention has been illustrated and described, it will be apparent to those skilled in the art that various changes and modifications may be made therein without departing from the spirit of the invention or from the scope of the appended claims.

I claim:

1. A rotor for a self-starting synchronous motor having electro-magnetic circuit elements of opposite polarity comprising, a rotatable member having a null position, a number of permanent magnet plates mounted on the member and each including oppositely facing surfaces, each of said plates including a lateral projection on one of said oppositely facing surfaces and a depression on the other of said oppositely facing surfaces for receipt of one of said lateral projections to align adjacent plates with respect to each other, and a ferrous metal arm mounted on said member and bent to form a pole rotatable in the path of the ends of the magnetic plates, said arm including a slot and arranged relative to one of said plates for engagement of said slot with a lateral projection on said one plate to position said arm relative to the plates and in a magnetically neutral position on said rotatable member to initiate rotation of said rotatable member when it is in a null position.

2. A rotor according to claim 1 wherein the projection and slot arrangement maintains said arm in a line transverse to the axis of said plates so that said arm is magnetically neutral with respect to said plates.

3. A self-starting synchronous motor comprising, a housing having a gear section and a motor section, a gear train in the gear section, a stator in the motor section having electro-magnetic circuit elements, a rotor positioned to rotate within the stator and connected to drive the gear train, said rotor including a number of permanent magnet plates each including oppositely facing surfaces with one of said oppositely facing surfaces including a laterally extending projection and the other of said oppositely facing surfaces including a depression for receiving the projection of an adjacent magnetic plate to align and interlock adjacent magnetic plates for rotation as a unit, means for energizing the stator to induce rotary motion of the rotor, said rotor normally assuming a position in which the electro-magnetic field set-up in the stator when energized will initiate rotary motion of the rotor and an abnormal position in which the rotor will not rotate when the stator is energized, and a ferrous metal arm secured to the rotor and including a pole rotatable in the path of the periphery of the rotor and having a portion of said arm positioned adjacent one of the stator circuit elements so that the magnetic polarity of said arm is induced by said one stator circuit element, and said arm being positioned adjacent a face of one of said magnetic plates and including a slot for engagement with a lateral projection on said one magnetic plate to position and hold said arm on a line extending transversely of the axis of said magnetic plates and in a magnetically neutral position with respect to said plates to impart rotary motion to the rotor when in the abnormal position.

4. A rotor for a self-starting synchronous motor having electro-magnetic circuit elements of opposite polarity comprising, a rotatable permanent magnet member having a null position and a generally planar face, a ferrous metal arm positioned operatively adjacent said planar face and including a pole rotatable in the path of the periphery of said magnet member, a projection on one of said planar faces and metal arm and a slot on the other for receipt of said projection, said projection and slot arranged to hold said ferrous arm in a magnetically neutral position with respect to said rotatable permanent magnet member to initiate rotation of said rotatable permanent magnet member when it is in a null position.

References Cited by the Examiner

UNITED STATES PATENTS

| | | | |
|---|---|---|---|
| 1,976,880 | 10/34 | Graseby | 310—162 X |
| 2,227,894 | 1/41 | Elms | 310—41 |
| 2,250,395 | 7/41 | Russell | 310—164 |
| 2,541,830 | 2/51 | Phaneuf | 310—164 |
| 2,677,776 | 5/54 | Kohlhagen | 310—156 |
| 2,691,112 | 10/54 | Clifford et al. | 310—156 |
| 3,032,670 | 5/62 | Fritz | 310—164 |

ORIS L. RADER, *Primary Examiner.*

MILTON O. HIRSHFIELD, *Examiner.*